(12) United States Patent
Gal

(10) Patent No.: US 10,046,268 B2
(45) Date of Patent: Aug. 14, 2018

(54) FLUE GAS DESULFURIZATION SYSTEMS AND METHODS OF USE

(71) Applicant: Marsulex Environmental Technologies Corporation, Lebanon, PA (US)

(72) Inventor: Eli Gal, Sunnyvale, CA (US)

(73) Assignee: Marsulex Environmental Technologies Corporation, Lebanon, PA (US)

( * ) Notice: Subject to any disclaimer, the term of this patent is extended or adjusted under 35 U.S.C. 154(b) by 256 days.

(21) Appl. No.: 15/083,567

(22) Filed: Mar. 29, 2016

(65) Prior Publication Data

US 2016/0220948 A1 Aug. 4, 2016

Related U.S. Application Data

(62) Division of application No. 12/725,766, filed on Mar. 17, 2010, now Pat. No. 9,327,234, which is a division of application No. 12/109,441, filed on Apr. 25, 2008, now Pat. No. 7,771,685.

(51) Int. Cl.

| | |
|---|---|
| *B01D 50/00* | (2006.01) |
| *B01D 47/06* | (2006.01) |
| *B01D 47/00* | (2006.01) |
| *B01D 53/14* | (2006.01) |
| *B01D 53/52* | (2006.01) |
| *B01D 53/18* | (2006.01) |

(52) U.S. Cl.
CPC ..... *B01D 53/1425* (2013.01); *B01D 53/1468* (2013.01); *B01D 53/1493* (2013.01); *B01D 53/18* (2013.01); *B01D 53/52* (2013.01); *B01D 2251/206* (2013.01); *B01D 2251/608* (2013.01); *B01D 2252/102* (2013.01); *B01D 2257/304* (2013.01); *B01D 2257/306* (2013.01)

(58) Field of Classification Search
CPC ........ B01D 53/52; B01D 53/14; B01D 53/50; B01D 53/62; F23J 15/00; C01B 32/50
USPC ............ 422/168, 170–171; 96/235; 261/115, 261/125; 423/243.02, 243.03
See application file for complete search history.

(56) References Cited

U.S. PATENT DOCUMENTS

| | | | |
|---|---|---|---|
| 6,277,343 B1 * | 8/2001 | Gansley ................. | B01D 53/40 422/168 |
| 6,531,104 B1 * | 3/2003 | Borio ................... | B01D 53/501 423/237 |

* cited by examiner

*Primary Examiner* — Monzer R Chorbaji
(74) *Attorney, Agent, or Firm* — Harman Global IP Law; Gary M. Hartman; Domenica N. S. Hartman

(57) ABSTRACT

Flue gas desulfurization processes and systems that utilize ammonia as a reactant, and in which any hydrogen sulfide and/or mercaptans within the ammonia are separated during the desulfurization process so as to prevent their release into the atmosphere. The process and system entail absorbing acidic gases from a flue gas with a scrubbing media containing ammonium sulfate to produce a stream of scrubbed flue gas, collecting the scrubbing media containing the absorbed acidic gases, injecting into the collected scrubbing media a source of ammonia that is laden with hydrogen sulfide and/or mercaptans so that the injected ammonia is absorbed into and reacted with the collected scrubbing media, stripping the hydrogen sulfide and/or mercaptans from the collected scrubbing media by causing the hydrogen sulfide and/or mercaptans to exit the collected scrubbing media as stripped gases, and collecting the stripped gases without allowing the stripped gases to enter the stream of scrubbed flue gas.

6 Claims, 2 Drawing Sheets

FLUE GAS DESULFURIZATION SYSTEMS AND METHODS OF USE

CROSS REFERENCE TO RELATED APPLICATIONS

This is a division patent application of co-pending U.S. patent application Ser. No. 12/725,766, filed Mar. 17, 2010, which is a division patent application of U.S. patent application Ser. No. 12/109,441, filed Apr. 25, 2008 (issued as U.S. Pat. No. 7,771,685). The contents of these prior applications are incorporated herein by reference.

BACKGROUND OF THE INVENTION

The present invention generally relates to processes and systems for removing acidic gases from flue gases produced by power generation, industrial, and other facilities. More particularly, this invention is directed to flue gas desulfurization (FGD) processes and systems that utilize ammonia to capture sulfur dioxide and produce ammonium sulfate, with the further capability of preventing or at least reducing the release of hydrogen sulfide and/or mercaptans into a scrubbed flue gas stream produced by such processes and systems.

Acidic gases, including sulfur dioxide ($SO_2$), hydrogen chloride (HCl) and hydrogen fluoride (HF), are known to be hazardous to the environment, and as a result their emission into the atmosphere is closely regulated by clean air statutes. For the removal of acidic gases from flue gases produced by utility and industrial plants, gas-liquid scrubbers (contactors, absorbers, etc.), are widely employed. Scrubbers generally employ a liquid-containing media that is brought into intimate contact with a flue gas to remove acidic gases by absorption. The process by which acidic gases are removed from flue gases in this manner is generally referred to as wet flue gas desulfurization (wet FGD).

The cleansing action produced by scrubbers is generally derived from the passage of a flue gas through a tower cocurrently or countercurrently to a descending liquid medium. Calcium-based slurries, sodium-based solutions and ammonia-based solutions are typical alkaline scrubbing media used in flue gas scrubbing operations. The cleansed gases are allowed to exit the tower, typically passing through a mist eliminator to atmosphere. The liquid medium and its absorbed gases are collected in a tank, typically at the bottom of the tower, where the absorbed gases are reacted to form byproducts that are useful or at least not harmful to the environment. While scrubbers utilizing calcium-based slurries generally perform satisfactorily, their operation results in the production of large quantities of wastes or gypsum, the latter having only nominal commercial value.

In contrast, ammonia-based scrubbing processes have been used to produce a more valuable ammonium sulfate fertilizer, as taught by U.S. Pat. Nos. 4,690,807 and 5,362,458, each of which are assigned to the assignee of the present invention and incorporated herein by reference. In these processes (also known as ammonium sulfate flue gas desulfurization, or AS FGD), the scrubbing solution is accumulated in a tank where the absorbed sulfur dioxide reacts with dissolved ammonia ($NH_3$) to form ammonium sulfite (($NH_4$)$_2SO_3$) and ammonium bisulfite ($NH_4HSO_3$), which are oxidized in the presence of sufficient oxygen to form ammonium sulfate (($NH_4$)$_2SO_4$) and ammonium bisulfate ($NH_4HSO_4$), the latter of which reacts with ammonia to form additional ammonium sulfate. A portion of the ammonium sulfate solution and/or ammonium sulfate crystals that form in the solution can then be drawn off to yield the desired byproduct of this reaction.

Ammonia produced from sour water in refinery, tar sands and other similar applications typically contains low concentrations of hydrogen sulfide ($H_2S$) and mercaptans (or thiols, which are compounds that contain the functional group composed of a sulfur atom and a hydrogen atom (—SH)). When the ammonia is used in an ammonium sulfate FGD system to capture sulfur dioxide, the hydrogen sulfide and mercaptans are stripped from the ammonia because of their volatility in ammonium sulfate, and thereafter become entrained with the flue gas. Scrubbed flue gases that exit the FGD system contain the entrained hydrogen sulfide and mercaptans which, in addition to being air pollutants, can contribute an undesirable odor to the FGD emissions.

Current technologies employed to purify ammonia and separate it from hydrogen sulfide and mercaptans are expensive capital-intensive processes, and consume considerable amounts of energy. As such, it would be desirable if an improved process were available that was capable of greatly reducing the amounts of hydrogen sulfide and mercaptans released from AS FGD systems, while also avoiding the disadvantages of prior art processes.

BRIEF DESCRIPTION OF THE INVENTION

The present invention provides flue gas desulfurization processes and systems that utilize ammonia as a reactant, and in which any hydrogen sulfide and/or mercaptans within the ammonia are separated during the desulfurization process so as to prevent their release into the atmosphere.

According to one aspect of the invention, a flue gas desulfurization process includes absorbing acidic gases from a flue gas with a scrubbing media containing ammonium sulfate to produce a stream of scrubbed flue gas, collecting the scrubbing media containing the absorbed acidic gases, injecting into the collected scrubbing media a source of ammonia that is laden with hydrogen sulfide and/or mercaptans so that the injected ammonia is absorbed into and reacted with the collected scrubbing media, stripping the hydrogen sulfide and/or mercaptans from the collected scrubbing media by causing the hydrogen sulfide and/or mercaptans to exit the collected scrubbing media as stripped gases, and collecting the stripped gases without allowing the stripped gases to enter the stream of scrubbed flue gas.

According to another aspect of the invention, a flue gas desulfurization system includes means for absorbing acidic gases from a flue gas with a scrubbing media containing ammonium sulfate to produce a stream of scrubbed flue gas, means for collecting the scrubbing media containing the absorbed acidic gases, means for injecting into the collected scrubbing media a source of ammonia that is laden with hydrogen sulfide and/or mercaptans so that the injected ammonia is absorbed into and reacted with the collected scrubbing media, means for stripping the hydrogen sulfide and/or mercaptans from the collected scrubbing media by causing the hydrogen sulfide and/or mercaptans to exit the collected scrubbing media as stripped gases, and means for collecting the stripped gases without allowing the stripped gases to enter the stream of scrubbed flue gas.

In flue gas desulfurization processes and systems of this invention, the scrubbing media can be collected in a tank, and the hydrogen sulfide and/or mercaptans can be stripped from the scrubbing media in the tank or in a separate vessel fluidically connected to the tank. In either case, it can be seen that a significant advantage of this invention is that ammonia containing undesired levels of hydrogen sulfide and mercaptans can be used in a desulfurization process, but with a greatly reduced risk of releasing gaseous hydrogen sulfide and mercaptans into the atmosphere along with the scrubbed flue gas. As such, the present invention is capable of avoiding disadvantages associated with current technologies used to purify ammonia and separate it from hydrogen sulfide and mercaptans prior to its use in an ammonium sulfate-based flue gas desulfurization process.

Other aspects and advantages of this invention will be better appreciated from the following detailed description.

DETAILED DESCRIPTION OF THE INVENTION

Figure 1:
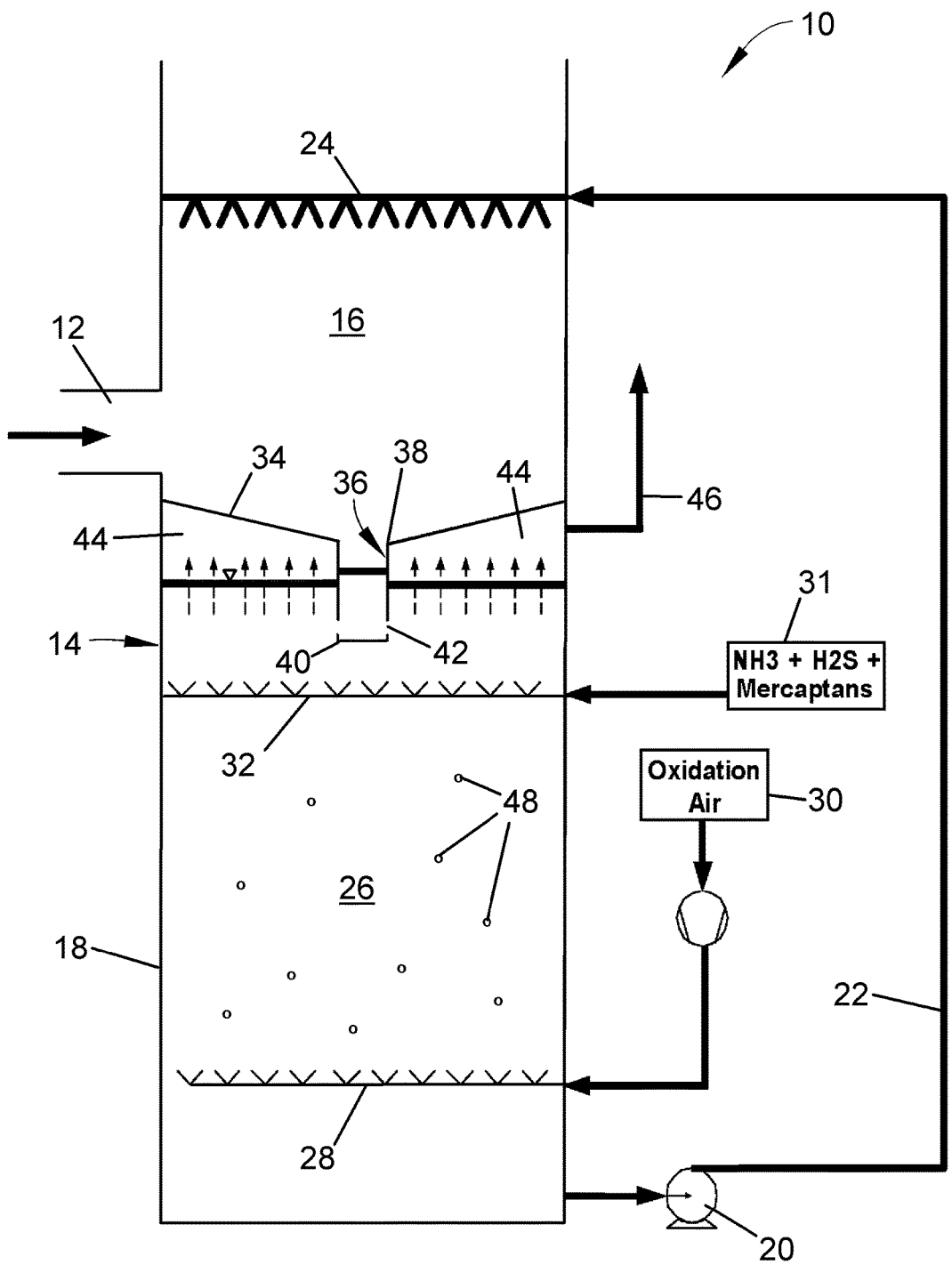
FIG. 1 is a schematic representation of a flue gas scrubbing apparatus configured for in situ removal of hydrogen sulfide and mercaptans in accordance with an embodiment of this invention.
Figure 2:
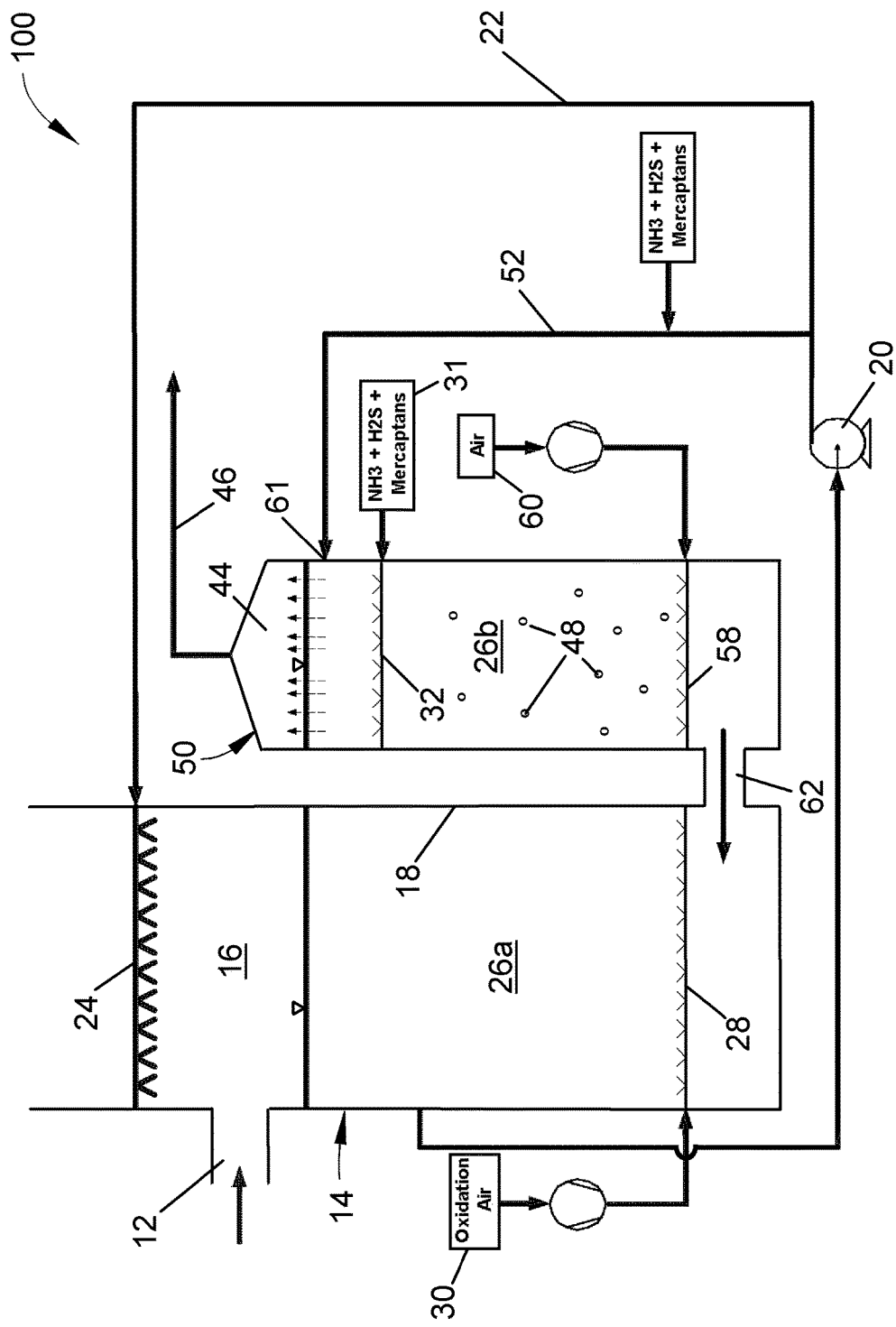
FIG. 2 is a schematic representation of a flue gas scrubbing apparatus equipped with a dedicated stripping tank for removal of hydrogen sulfide and mercaptans in accordance with another embodiment of this invention.

FIGS. 1 and 2 represent two embodiments of ammonia-based FGD systems 10 and 100 that allow the use of ammonia containing hydrogen sulfide and/or mercaptans. The systems 10 and 100 employ a relatively lowcost process for reducing the release of hydrogen sulfide and mercaptans by separating and capturing these pollutants after they are stripped from the contact media used in the AS FGD process. The process can be integrated into an otherwise conventional AS FGD system and operation through relatively uncomplicated modifications to the AS FGD system, incurring minimal capital investment and energy consumption. FIGS. 1 and 2 are drawn for purposes of clarity when viewed in combination with the following description, and therefore are not necessarily to scale.

The invention utilizes the fact that ammonia is soluble in water and acidic solutions, while the solubilities of hydrogen sulfide and mercaptans in water and acidic solutions are lower. Ammonium sulfate scrubbing media (including solutions and slurries, depending on solids content) accumulated in AS FGD systems after the absorption of sulfur dioxide from flue gases are acidic, with pH levels typically in a range of about 4 to about 6. When ammonia laden with hydrogen sulfide and/or mercaptans is introduced into the ammonium sulfate media, the ammonia is readily absorbed and reacts with the absorbed sulfur dioxide, while the hydrogen sulfide and mercaptans are stripped from the liquid to the gas phase. In typical FGD systems, the reaction tank in which the scrubbing media is accumulated is often open at its upper end. Air that has been injected into the scrubbing media to react and form ammonium sulfate mixes with the stripped hydrogen sulfide and mercaptans, and the resulting mixture is then able to mix with the scrubbed flue gases, producing an undesirable odor and emission of harmful species.

The present invention reduces the release of hydrogen sulfide and mercaptans by adding the hydrogen sulfide and mercaptans-laden ammonia to the ammonium sulfate media in such a way that stripping of hydrogen sulfide and mercaptans occurs in a confined zone, thus avoiding the mixing of hydrogen sulfide and mercaptans gases with the scrubbed flue gas. The gaseous hydrogen sulfide and mercaptans are then diverted away from the FGD system, and can be captured, incinerated, or otherwise prevented from release into the atmosphere.

In accordance with the above, the AS FGD systems 10 and 100 represented in FIGS. 1 and 2 are each configured to separate hydrogen sulfide and mercaptans and prevent the contamination of a flue gas. The FGD systems 10 and 100 are generally represented as being of a type that scrubs flue gases produced by the burning of fossil fuels or another process that results in the flue gas containing acidic gases, such as sulfur dioxide, hydrogen chloride and/or hydrogen fluoride, as well as particulate matter, nitrogen oxides (NOx), etc. Referring to FIG. 1, the conventional components of the FGD system 10 include an absorber tower 14 having a contact zone 16 in which an ammonium sulfate scrubbing media (e.g., solution or slurry) 26 is brought into contact with a flue gas that enters the FGD system 10 through an inlet duct 12. The scrubbing media 26 is shown as being collected in a tank 18 located at the bottom of the tower 14. The media 26 is drawn from the tank 18 with a pump 20 and then delivered through a pipe 22 to the contact zone 16, where the scrubbing media 26 is dispersed with spray nozzles 24 or another suitable delivery device. After being scrubbed by the scrubbing media 26, the resulting scrubbed stream of flue gas flows upward, typically through a mist eliminator and/or other equipment (not shown), and is eventually released to atmosphere through a chimney or other suitable structure. As with many existing wet flue gas desulfurization facilities, the FGD system 10 is equipped for in situ forced oxidation of the scrubbing media 26 that has collected in the tank 18. In FIG. 1, a suitable source 30 of oxygen, such as air or another oxygen-containing gas (hereinafter referred to as air for convenience), is represented as being introduced into the tank 18 with a sparger 28 connected to the oxygen source 30. The air is typically injected near the bottom of the tank 18, so that the gas migrates upward as bubbles 48 through the scrubbing media 26 in the tank 18. In this manner, reaction products produced by contacting the acidic gases of the flue gas with the scrubbing media 26 are oxidized by the oxygen in the sparged air to preferably yield ammonium sulfate as a useful fertilizer byproduct.

As taught by commonly-assigned U.S. Pat. Nos. 4,690,807 and 5,362,458, following absorption of the acidic gases present in a flue gas, the ammonium sulfate media 26 collected in the tank 18 has a relatively low pH, for example, about 4 to about 6. Aqueous ammonia (ammonium hydroxide, $NH_4OH$) or another source of ammonia 31 is introduced into the collected media 26, such as with a second sparger 32, typically near the top of the reaction tank 18 and preferably a meter or so below the surface of the scrubbing media 26 in the tank 18. The absorbed sulfur dioxide reacts with the ammonia to form ammonium sulfite ($(NH_4)_2SO_3$ and ammonium bisulfite ($NH_4HSO_3$), which are then oxidized in the presence of sufficient oxygen (introduced by the sparger 28) to form precipitates of ammonium sulfate and ammonium bisulfate ($NH_4HSO_4$). Ammonium bisulfate undergoes a second reaction with the injected ammonia to form additional ammonium sulfate precipitate. A portion of the ammonium sulfate media 26 is typically removed from the tank 18 and dewatered with a suitable dewatering device (not shown) to precipitate ammonium sulfate, which can then be sold as a valuable fertilizer. If hydrogen chloride and hydrogen fluoride were present in the flue gas, as is typically the case with flue gas produced by the combustion of coal, these acidic gases are also captured to form ammonium chloride and ammonium fluoride, which can be removed in the same manner. Further details regarding the desulfurization of flue gases can be obtained in the prior art, including the above-noted U.S. Pat. Nos. 4,690,807 and 5,362,458, and therefore will not be discussed in any further detail here.

Any hydrogen sulfide and mercaptans present in the ammonia introduced with the sparger 32 will also be present in the scrubbing media 26 collected in the tank 18. A portion of the absorbed hydrogen sulfide and mercaptans is likely to be stripped from the scrubbing media 26 by the action of the oxidation air introduced into the scrubbing media 26 by the sparger 28, with the result that the oxidation air released from the surface of the scrubbing media 26 in the tank 18 (as represented by the arrows in FIG. 1) will be accompanied by gaseous hydrogen sulfide and mercaptans. To inhibit mixing of the oxidation air and gaseous hydrogen sulfide and mercaptans released from the scrubbing media 26 with the flue gas traveling through the contact zone 16, FIG. 1 shows a divider 34 separating the reaction tank 18 from the contact zone 16. The divider 34 is represented as having an inverted conical shape, with a passage 36 located at its central lowermost extent through which the scrubbing media 26 can enter the tank 18 following contact with the flue gas in the contact zone 16. The passage 36 is represented as being entirely open at its upper limit 38 and closed at its lower limit 40, which is submerged below the surface of the scrubbing media 26 in the tank 18. The passage 36 further has one or more submerged peripheral openings 42 located at its perimeter near its closed lower limit 40, and through which the scrubbing media 26 is able to flow directly into the collected media 26 within the tank 18.

The inverted conical shape of the divider 34 and the size and configuration of the passage 36 cause the oxidation air and gaseous hydrogen sulfide and mercaptans released from the scrubbing media 26 to flow toward the perimeter of the tank 18 above the scrubbing media 26, and into a confined zone 44 bounded by the surface of the scrubbing media 26, the divider 34, the exterior of the passage 36, and the exposed wall of the tank 18 between the surface of the scrubbing media 26 and the divider 34. From the confined zone 44, the gaseous hydrogen sulfide and mercaptans can be diverted through a pipe 46 or other suitable structure and subsequently captured, incinerated, or otherwise disposed of or processed in any desirable manner.

The FGD system 100 represented in FIG. 2 provides an alternative configuration capable of removing hydrogen sulfide and mercaptans brought into the system 100 with ammonia. Because of the similarities in their construction and operation, consistent reference numbers are used to identify functionally similar structures in FIGS. 1 and 2. The system 100 of FIG. 2 primarily differs from that of FIG. 1 by providing a dedicated hydrogen sulfide and mercaptans stripping vessel 50 in close proximity to the tower 14, the latter of which again includes a contact zone 16 and reaction tank 18 whose purposes are essentially the same as described for the embodiment of FIG. 1, including the collection of the ammonium sulfate scrubbing media in the tank 18 to define a quantity of collected scrubbing media 26a. The reaction tank 18 and the stripping vessel 50 are connected near their lower ends via a passage 62 so that another quantity of collected scrubbing media 26b is within the vessel 50. The passage 62 provides for equalization of the liquid levels of the collected scrubbing media 26a and 26b within the tank 18 and vessel 50.

As in the system 10 of FIG. 1, the system 100 of FIG. 2 utilizes a pump 20 to draw the collected scrubbing media 26a from the reaction tank 18, and then deliver the drawn scrubbing media 26a through a pipe 22 to nozzles 24 located in the contact zone 16 of the tower 14. In addition, a portion of the drawn scrubbing media 26a is shown as being delivered by the pump 20 through a second pipe 52 to the stripping vessel 50, where the drawn scrubbing media 26a is injected into the collected scrubbing media 26b within the vessel 50 through an inlet 61 located at some distance below the surface of the scrubbing media 26b in the vessel 50. For the reasons described in reference to the system 10 of FIG. 1, air is preferably injected with a sparger 28 into the scrubbing media 26a near the bottom of the reaction tank 18. Air is also injected into the collected scrubbing media 26b within the stripping vessel 50 with a sparger 58, preferably at roughly the same elevation as the air injection site in the reaction tank 18. Instead of being injected into the reaction tank 18 as done in FIG. 1, ammonia (and any hydrogen sulfide and/or mercaptans contained therein) is drawn from a suitable source 31 and injected with a sparger 32 into the stripping vessel 50. Similar to FIG. 1, the ammonia is preferably injected near the top of the vessel 50, for example, a meter or so below the surface of the scrubbing media 26b in the vessel 50, and preferably below the location of the inlet 61 where the scrubbing media 26a is introduced into the scrubbing media 26b within the vessel 50. Alternatively, the ammonia laden with hydrogen sulfide and mercaptans can be injected into the pipe 52, so as to be mixed and delivered with the scrubbing media 26a introduced into the vessel 50.

The injected ammonia is captured by the low-pH scrubbing media 26b as it flows downwardly through the stripping vessel 50 toward the passage 62, which serves as an outlet of the vessel 50 to the tank 18. In so doing, the scrubbing media 26b within the vessel 50 flows counter-currently to the air injected into the vessel 50 with the sparger 58. Simultaneously, the hydrogen sulfide and mercaptans introduced with the ammonia into the vessel 50 are stripped out of the scrubbing media 26b by the upward flow of bubbles 48 from the air sparger 58. Air and the stripped gaseous hydrogen sulfide and mercaptans exit the scrubbing media 26b and enter the confined zone 44 between the surface of the scrubbing media 26b in the vessel 50 and the top of the vessel 50, and from there can be diverted through a pipe 46 or other suitable structure and subsequently captured, incinerated, or otherwise disposed of or processed in any desirable manner. The pH of the scrubbing media 26b increases as it flows downward through the stripping vessel 50 as a result of the captured ammonia, and is returned by gravity to the reaction tank 18 through the passage 62.

In view of the above, it can be appreciated that the systems 10 and 100 effectively isolate and remove hydrogen sulfide and mercaptans that are typically present in sources of ammonia (e.g., aqueous ammonia) used in AS FGD processes, and otherwise escape into the atmosphere with the scrubbed flue gases. As such, the invention avoids the disadvantages of current technologies that seek to avoid hydrogen sulfide and mercaptans by purifying ammonia using expensive and capital-intensive processes.

While the invention has been described in terms of specific embodiments, it is apparent that other forms could be adopted by one skilled in the art. For example, the physical configuration of the systems 10 and 100 could differ from that shown, and components other than those noted could be used, including devices other than spargers and nozzles that are adequately capable of dispensing fluids including air, ammonia, and scrubbing media in a suitable manner. Therefore, the scope of the invention is to be limited only by the following claims.

The invention claimed is:

1. A flue gas desulfurization system comprising:

means for absorbing acidic gases from a flue gas by contacting the flue gas with a scrubbing media containing ammonium sulfate to produce a stream of scrubbed flue gas that is released to atmosphere;

means for collecting the scrubbing media containing the absorbed acidic gases, the collecting means comprising a tank into which the scrubbing media containing the absorbed acidic gases is received from the absorbing means to define a first quantity of collected scrubbing media within the tank, the collecting means further comprising a vessel fluidically coupled to the tank to receive the scrubbing media from the first quantity of collected scrubbing media within tank and thereby define a second quantity of collected scrubbing media within the vessel, the vessel having an inlet below a surface of the second quantity of collected scrubbing media through which the scrubbing media is received from the tank and an outlet below the inlet that fluidically connects the vessel to the tank so that the second quantity of collected scrubbing media flows downwardly from the inlet to the outlet of the vessel and then flows into the first quantity of collected scrubbing media at a location below a surface of the first quantity of the collected scrubbing media within the tank;

a source of ammonia that is laden with at least one compound chosen from the group consisting of hydrogen sulfide and mercaptans;

means for injecting the ammonia from the source into the second quantity of collected scrubbing media between the inlet and the outlet of the vessel, the injected ammonia being absorbed into and reacted with the second quantity of collected scrubbing media within the vessel;

means within the vessel for stripping the at least one compound from the second quantity of collected scrubbing media by causing the at least one compound to exit the second quantity of collected scrubbing media as stripped gases, the stripping means comprising means for injecting an oxygen-containing gas into the second quantity of collected scrubbing media at a location above the outlet of the vessel and below where the ammonia is injected from the source into the second quantity of collected scrubbing media by the means for injecting the ammonia;

means for collecting the stripped gases of the at least one compound without allowing the stripped gases to enter the stream of scrubbed flue gas; and means for isolating and removing the stripped gases from the flue gas desulfurization system so that the at least one compound contained in the stripped gases does not escape into the atmosphere with the stream of scrubbed flue gas.

2. The flue gas desulfurization system according to claim 1, further comprising means for transporting the first quantity of collected scrubbing media from the tank to the inlet of the vessel.

3. The flue gas desulfurization system according to claim 2, wherein the transporting means comprises a pump.

4. The flue gas desulfurization system according to claim 1, wherein the vessel and the outlet thereof are configured so that the second quantity of collected scrubbing media is returned by gravity through the outlet of the vessel to the first quantity of collected scrubbing media within the tank.

5. The flue gas desulfurization system according to claim 1, wherein the vessel, the outlet thereof, and the means for injecting the oxygen-containing gas are configured so that the second quantity of collected scrubbing media within the vessel flows to the outlet counter-currently to the oxygen-containing gas flowing through the second quantity of collected scrubbing media and the at least one compound is stripped from the second quantity of collected scrubbing media by bubbles of the oxygen-containing gas that are formed by the means for injecting the oxygen-containing gas and rise through the second quantity of collected scrubbing media within the vessel.

6. The flue gas desulfurization system according to claim 1, wherein the means for collecting the stripped gases collects the stripped gases in a confined zone between an upper end of the vessel and the surface of the second quantity of collected scrubbing media within the vessel.

\* \* \* \* \*